United States Patent
Smith et al.

(10) Patent No.: US 9,891,342 B2
(45) Date of Patent: Feb. 13, 2018

(54) METHOD OF PROCESSING GRAVITY GRADIENT DATA

(71) Applicant: TECHNOLOGICAL RESOURCES PTY. LIMITED, Brisbane, Queensland (AU)

(72) Inventors: Robert James Smith, Surrey Hills (AU); John William Paine, Parkside (AU)

(73) Assignee: Technological Resources Pty, Limited, Brisbane (AU)

( * ) Notice: Subject to any disclaimer, the term of this patent is extended or adjusted under 35 U.S.C. 154(b) by 373 days.

(21) Appl. No.: 14/431,156

(22) PCT Filed: Sep. 25, 2013

(86) PCT No.: PCT/AU2013/001096
§ 371 (c)(1),
(2) Date: Mar. 25, 2015

(87) PCT Pub. No.: WO2014/047682
PCT Pub. Date: Apr. 3, 2014

(65) Prior Publication Data
US 2015/0219788 A1    Aug. 6, 2015

(30) Foreign Application Priority Data
Sep. 25, 2012    (AU) .............................. 2012904183

(51) Int. Cl.
*G01V 7/06*    (2006.01)
*G01V 7/16*    (2006.01)

(52) U.S. Cl.
CPC . *G01V 7/16* (2013.01); *G01V 7/06* (2013.01)

(58) Field of Classification Search
CPC ............... G01V 7/06; G01V 7/14; G01V 7/16
See application file for complete search history.

(56) References Cited

U.S. PATENT DOCUMENTS

| 6,837,106 B2 * | 1/2005 | Etkin ....................... G01V 7/16 73/382 G |
| 2006/0004519 A1 | 1/2006 | Humphrey et al. |

(Continued)

FOREIGN PATENT DOCUMENTS

CN    101636669 A    1/2010

OTHER PUBLICATIONS (CN)—Machine Translation—CN101636669.
(Continued)

*Primary Examiner* — Bryan Bui
(74) *Attorney, Agent, or Firm* — Banner & Witcoff, Ltd.

(57) ABSTRACT

The present disclosure provides a method of processing gravity gradient data indicative of an output generated by an airborne gravity gradiometer that is moving along a flight path over a terrain. The method comprises the step of providing the gravity gradient data. The gravity gradient data comprising gravity gradient data elements that are associated with respective flight path segments of the airborne gravity gradiometer. Further, the method comprises providing terrain data indicative of a topography and a density or a density distribution of the terrain above a datum that is below the surface of the terrain over which the airborne gravity gradiometer is moved. The method also comprises providing information concerning the flight path of the airborne gravity gradiometer in three dimensions. In addition, the method comprises calculating the gravity gradient response of the terrain using the provided terrain data and the provided information concerning the flight path. The gravity gradient terrain response data is calculated for a plurality of locations of the gravity gradiometer along at least some of the flight path segment. In addition, the method comprises correcting the gravity gradient data by forming a difference between the calculated gravity gradient terrain (Continued)

response of the terrain topography and the gravity gradient data.

11 Claims, 5 Drawing Sheets

(56) References Cited

U.S. PATENT DOCUMENTS

| | | |
|---|---|---|
| 2006/0036367 A1 | 2/2006 | Brewster |
| 2009/0216451 A1* | 8/2009 | Barnes ............... G01V 7/00 702/5 |
| 2010/0094556 A1 | 4/2010 | Barnes et al. |
| 2014/0081595 A1* | 3/2014 | White ............... G01V 7/06 702/154 |

OTHER PUBLICATIONS

International Search Report and Written Opinion dated Nov. 15, 2013 (PCT/AU2013/001096); ISA/AU.

Li, Y et al., "Terrain correction and its effect on 3D inversion of airborne gravity gradiometry data", In R. J. L. Lane (editor), 2010, Airborne Gravity 2010—Abstracts from the ASEG-PESA Airborne Gravity 2010 Workshop: Published jointly by Geoscience Australia and the Geological Survey of New South Wales, Geoscience Australia Record 2010/23 and GSNSW File GS2010/0457, p. 131-141, retrieved on Feb. 4, 2013. Retrieved from the Internet URL: www.ga.gov.au/image_cache/GA17945.pdf. Refer to p. 131-141.

Lane, R., "Integrating ground and airborne data into regional gravity compilations", in RJ.L. Lane, (editor), 2004, Airborne Gravity 2004—Abstracts from the ASEG-PESA Airborne Gravity 2004 Workshop: Geoscience Australia Record 2004/18, p. 81-97, retrieved on Feb. 4, 2013. Retrieved from the Internet URL: www.ga.gov.au/image_cache/GA16642.pdf. Refer to p. 81-97.

Murray, A. S. et al., "Best Practice in Gravity Surveying", 2001, retrieved on Feb. 13, 2013. Retrieved from the internet URL:http://www.ga.gov.au/webtemp/image_cache/GA13068.pdf. Refer to the whole document and in particular to p. 29.

International Type Search Report dated Nov. 15, 2013.

Written Opinion dated Jul. 2, 2014 (PCT/AU2013/001096); IPEA/AU.

* cited by examiner

METHOD OF PROCESSING GRAVITY GRADIENT DATA

CROSS-REFERENCE TO RELATED APPLICATIONS

The present application is a U.S. National Phase filing of International Application No. PCT/AU2013/001096, filed on Sep. 25, 2013, designating the United States of America and claiming priority to Australian Patent Application No. 2012904183 filed Sep. 25, 2012, and the present application claims priority to and the benefit of both the above-identified applications, which are incorporated by reference herein in their entireties.

FIELD OF THE INVENTION

The present invention relates to a method of processing gravity gradient data indicative of an output generated by an airborne gravity gradiometer that is moving along a flight path over a terrain and relates particularly, though not exclusively, to a method of processing gravity gradient data for locating valuable materials, such as an ore.

BACKGROUND OF THE INVENTION

Valuable materials in the ground, such as ores or oil deposits, can be detected directly or indirectly using suitable airborne gravity gradiometers. Such valuable materials usually have a density other than that of surrounding materials, which results in a local variation or "anomaly" in gravity gradient that is detectable by the gravity gradiometer when the gravity gradiometer is flown over a terrain including the valuable material. The gravity gradient anomaly is usually extremely small and its detection requires high precision instrumentation. The valuable material often is below the surface of the terrain and the gravity gradient anomaly is proportional to $1/r^3$ (r: distance from the centre of the valuable material to a detector of the gravity gradiometer).

Topographical changes of the surface of the terrain also cause variations in gravity gradient and these variations may be larger than the gravity gradient anomalies arising from the valuable material, as the surface of the terrain is closer to the airborne gravity gradiometer than the (usually deeper) targets. It is consequently desirable to correct gravity gradiometer measurements for these terrain effects in order to facilitate recognition of anomalies from deeper sources.

US patent application publication number US 20100094556 discloses a method of correcting gravity gradient data. The measured gravity gradient data is integrated in the time domain and then corrected for terrain effects. The present invention used an alternative approach that provides further improvement.

SUMMARY OF THE INVENTION

The present invention provides a method of processing gravity gradient data indicative of an output generated by an airborne gravity gradiometer that is moving along a flight path over a terrain, the method comprising the steps of:
providing the gravity gradient data using the airborne gravity gradiometer, the gravity gradient data comprising gravity gradient data elements that are associated with respective flight path segments of the airborne gravity gradiometer;
providing terrain data indicative of a topography and a density or a density distribution of the terrain above a datum that is below the surface of the terrain over which the airborne gravity gradiometer is moved;
providing information concerning the flight path of the airborne gravity gradiometer in three dimensions;
calculating a theoretical gravity gradient response of the terrain using the provided terrain data and the provided information concerning the flight path, the theoretical gravity gradient terrain response being calculated for a plurality of locations along each of at least some of the flight path segments of the airborne gravity gradiometer; and
correcting the provided gravity gradient data comprising calculating a difference between the calculated theoretical gravity gradient terrain response and the provided gravity gradient data.

The theoretical gravity gradient response may be calculated for a plurality of locations of the gravity gradiometer along each of at least the majority of the flight path segments.

The gravity gradient may be measured continuously while the gravity gradiometer is moved over the ground plane, but the gravity gradient data elements may be provided in the form of integrals corresponding to respective flight path segments along which the gravity gradiometer is moved. The flight path segments may have any suitable length, such as 30, 40, 50, 60, 70, 80, 90, or 100 m and may correspond to periods of flying time ranging from a fraction of a second to one second or more.

The step of calculating the theoretical gravity gradient terrain response may comprise providing theoretical gravity gradient terrain response data corresponding to any number of locations, such as 2, 3, 5 10 or more locations along each of the flight path segments.

Further, the step of calculating the theoretical gravity gradient terrain response may comprise integrating gravity gradient terrain response data along the respective flight path segments to provide integrals of the theoretical gravity gradient terrain response data that correspond to the respective flight path segments along which the gravity gradiometer is moved. The theoretical gravity gradient terrain response data may initially be fitted using a curve or spline and the fitted data may then be integrated.

The step of calculating the difference between the calculated theoretical gravity gradient terrain response and the provided gravity gradient data may comprise calculating a difference between the gravity gradient data elements provided in the form of integrals and the integrals of the theoretical gravity gradient terrain response data.

In one specific embodiment the step of providing flight path information comprises providing flight path data indicative of a plurality of locations along each of at least some (typically at least the majority) of the flight path segments, for example at 2, 5, 10 or more locations along each flight path segment. The step of providing flight path information may further comprise fitting the provided flight path data using a curve or spline to approximate the actual flight path segments of the gravity gradiometer. In this embodiment the step of calculating the theoretical gravity gradient terrain response may comprise integrating the theoretical gravity gradient terrain response data using the curve or spline fitting flight path data.

The step of calculating the theoretical gravity gradient response of the terrain may comprise calculating the terrain response for a number of locations that are closer together in areas in which the terrain response changes more rapidly than in areas in which the terrain changes less rapidly.

The method may also comprise selecting a spacing between locations along the flight path for which the gravity gradient response of the terrain is calculated. Selecting the spacing may be performed as a function of a change in the gravity gradient data along the flight path and/or as a function of a change in the gravity gradient response of the terrain initially calculated for some of the locations.

The step of correcting the gravity gradient data may comprise forming a difference between the calculated theoretical gravity gradient terrain response of the terrain topography and the provided gravity gradient data in a manner such that the formed difference is only indicative of variations from an assumed density above the datum, and any variations below the datum.

The step of providing terrain data may comprise providing a digital terrain model that may be determined independent of gravity gradient measurements that were used to provide the above-mentioned gravity gradient data. Further, the step of providing the terrain data may comprise selecting or estimating a density or density distribution of the terrain between the datum and the surface of the terrain.

The invention will be more fully understood from the following description of specific embodiments of the invention. The description is provided with reference to the accompanying drawings.

DETAILED DESCRIPTION OF SPECIFIC EMBODIMENTS

Figure 1:
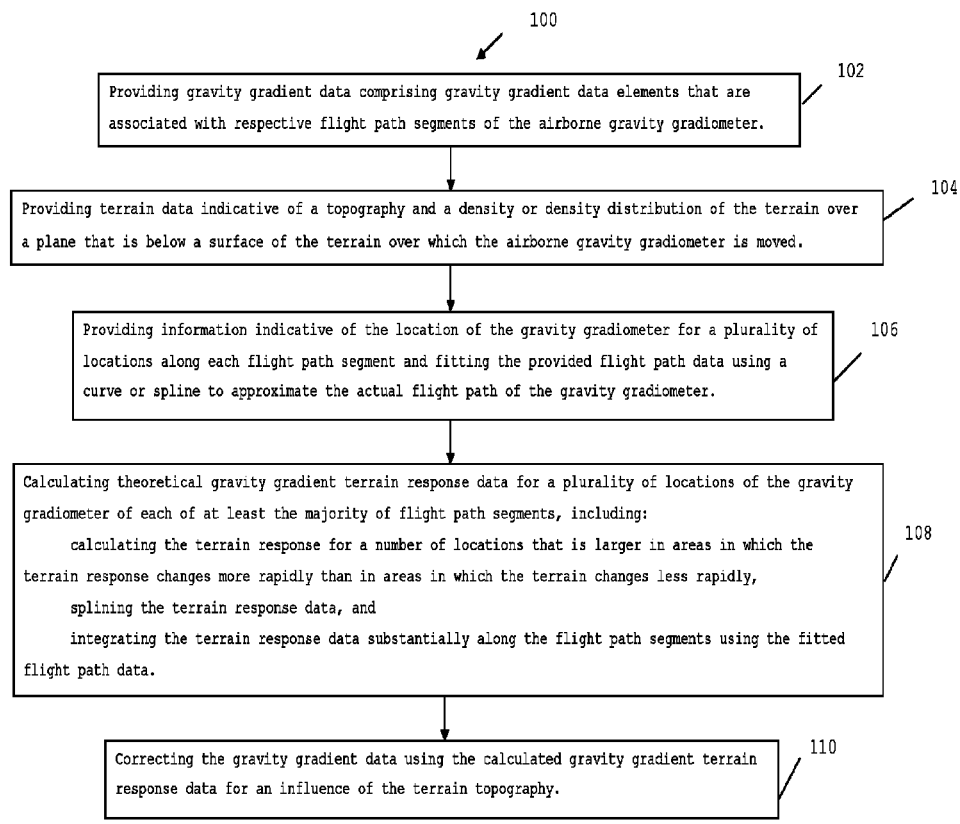
FIGS. 1, 2(a) and 2(b) illustrate a method of processing gravity gradient data indicative of an output generated by an airborne gravity gradiometer in accordance with a specific embodiment of the present invention.
Figure 2:
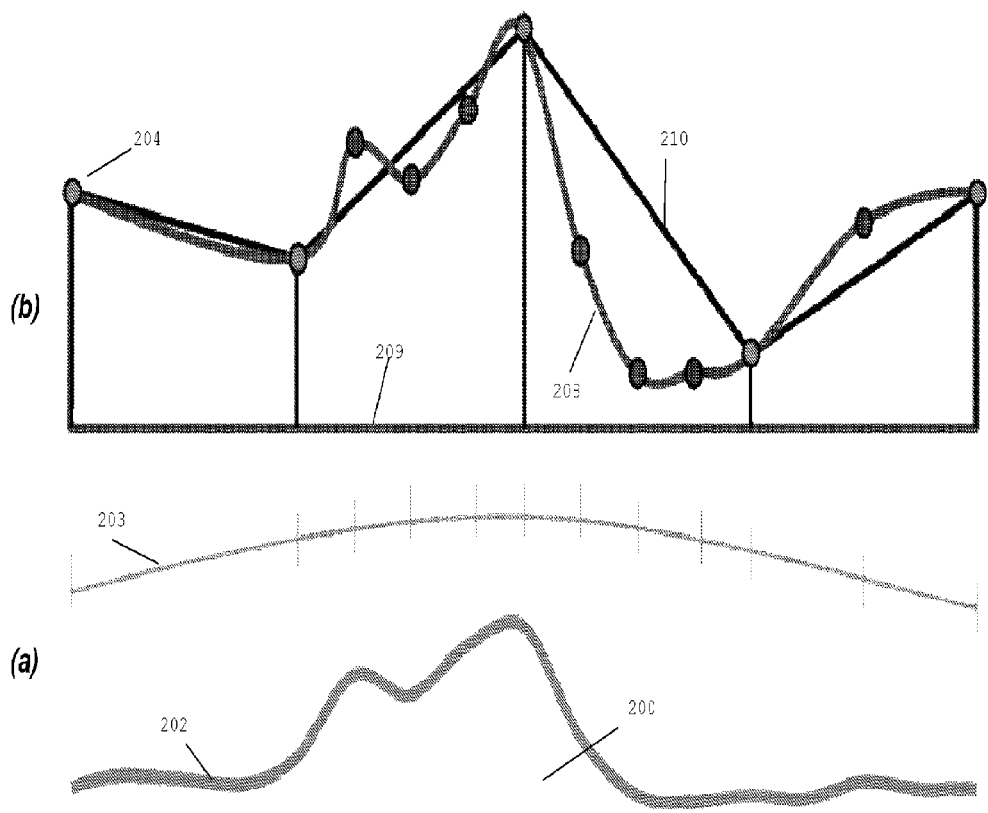

Referring initially to FIGS. 1 and 2, a method of processing gravity gradient data indicative of an output generated by an airborne gravity gradiometer is now described.

The gravity gradiometer is in this embodiment provided in the form of the gravity gradiometer as described in U.S. Pat. No. 7,823,449 in the name of the present applicant. However, it will be appreciated by a person skilled in the art that the gravity gradiometer may also be provided in other forms.

The gravity gradiometer may be flown over a terrain 200 and may be used to detect deposits of valuable materials (ores or other deposits) below the surface 202 of the terrain 200.

The gravity gradiometer is a high precision instrument that is used to detect very small variations in gravity gradients. In the present example the gravity gradiometer is flown along a flight path 203 over a topographic surface 202 in an aircraft in a predetermined grid pattern and in this embodiment detects the gravity gradient continuously. In this example the gravity gradient data is integrated to provide gravity gradient data elements that correspond to segments of the flight path 203, such as flight path segments along which the gravity gradiometer was moved during 1 second. However, it will be appreciated by a person skilled in the art that alternatively the gravity gradiometer data may be integrated in any other suitable manner. Generally, an output of the gravity gradiometer is integrated such that a sequence of data elements is generated and each data element corresponds to a flight path segment along which the gravity gradiometer was flown.

Consequently, the method 100 comprises the initial step of providing gravity gradient data comprising gravity gradient data elements (values) that are associated with respective flight path segments of the airborne gravity gradiometer.

The gravity gradient response is proportional to $1/r^3$ (r: distance from the body causing the gravity gradient response to the gravity gradiometer) and consequently deposits of valuable material that are located well below the surface 202 of the terrain 200 often only cause a very small variation in gravity gradient compared to that arising from topographical changes of a surface 202 of the terrain 200. Consequently, it is often desirable to correct measured gravity gradient data for terrain effects.

Information concerning the topography of the terrain 200 over which the gravity gradiometer is flown is in this example provided using Laser Imaging Detection and Ranging (LIDAR) or other suitable techniques. The method 100 comprises step 104 of providing such terrain data indicative of the topography of the terrain 200. Further, step 104 provides a density distribution of the terrain 200 over a datum that is below the surface 202 of the terrain 200. The density is usually, but not necessarily, assumed to be uniform between the datum and the surface 202 of the terrain 200. The datum typically is a flat plane, but in very large surveys, this datum may also be a curved surface e.g. the Geoid or mean sea level.

As mentioned above, the gravity gradient is detected continuously, but integrated over finite intervals. In this example, the intervals correspond to flight path segments along which the gravity gradiometer is moved during one second. The lengths of the flight path segments dependent on a velocity of the aircraft. For example, the lengths may be of the order of 50 to 60 meters.

The method 100 comprises step 106 of providing detailed information concerning the flight path 203 of the gravity gradiometer. For example, this information may be provided using a global positioning system (GPS) at suitable time intervals, such as 0.1 to 1 second. Flight path data is provided in three dimensions and for a plurality of locations along each flight path segment (such as 2, 5, 10 or any other number of locations). The flight path data is then fitted using a curve or spline to approximate the actual flight path of the gravity gradiometer.

Using the provided data regarding the terrain 200 and the flight path 203, theoretical gravity gradient terrain response data are then calculated for a plurality of positions along each of at least the majority of the flight path segments. The number of locations for which the theoretical gravity gradient response is calculated may or may not be the same as the number of locations for which the flight path data is provided for each flight path segment. FIG. 2(a) indicates these locations in the form of vertical lines along the flight path 203. Generally, the theoretical gravity gradient response data may be calculated for any number of locations along the flight path segments, such as two, five or ten or more locations along each flight path segment. In the present example the theoretical gravity gradient response is calculated for more locations at regions in which the terrain surface 202 changes more rapidly than for locations at regions at which the terrain surface 202 changes less rapidly, which will be described in further detail below.

Step 108 of the method 100 comprises calculating the theoretical gravity gradient terrain response data for a plurality of locations along each of the majority of the flight path segments and the calculated data are visualised in the form of dots 204 in FIG. 2(b). These values of the theoretical gravity gradient terrain response are spline-fitted (spline 208) and then integrated substantially along the flight path segments and using the curve or spline fitting flight path data. As mentioned above, a uniform density is assigned for the region between the terrain surface and the datum. The theoretical gravity gradient terrain response is dependent on topographical changes along the surface 202 of the terrain 200 and may be represented schematically in terms of the area between datum 209 and the spline 208 as shown in FIG. 2(b). The straight portions 210 represent terrain response approximations obtained using conventional point correction methods (one calculated gravity gradient terrain response element per flight segment), and the difference between the straight portions 210 and the spline 208 is representative of an improvement of the method in accordance with an embodiment of the present invention.

Step 110 of the method 100 comprises correcting the gravity gradient data using the calculated gravity gradient terrain response data. In this step the calculated gravity gradient terrain response data (processed in the above-described manner) for each flight path segment is subtracted from the corresponding gravity gradient data. Consequently, a variation of a terrain effect along each flight path segment (provided in the form of the plurality of calculated gravity gradient response data along each flight path segment) is taken into account for correcting the gravity gradient data for terrain effects, which improves the estimate of terrain effects which, when removed, enables better detection of small "anomalies" from deeper sources.

Figure 3:
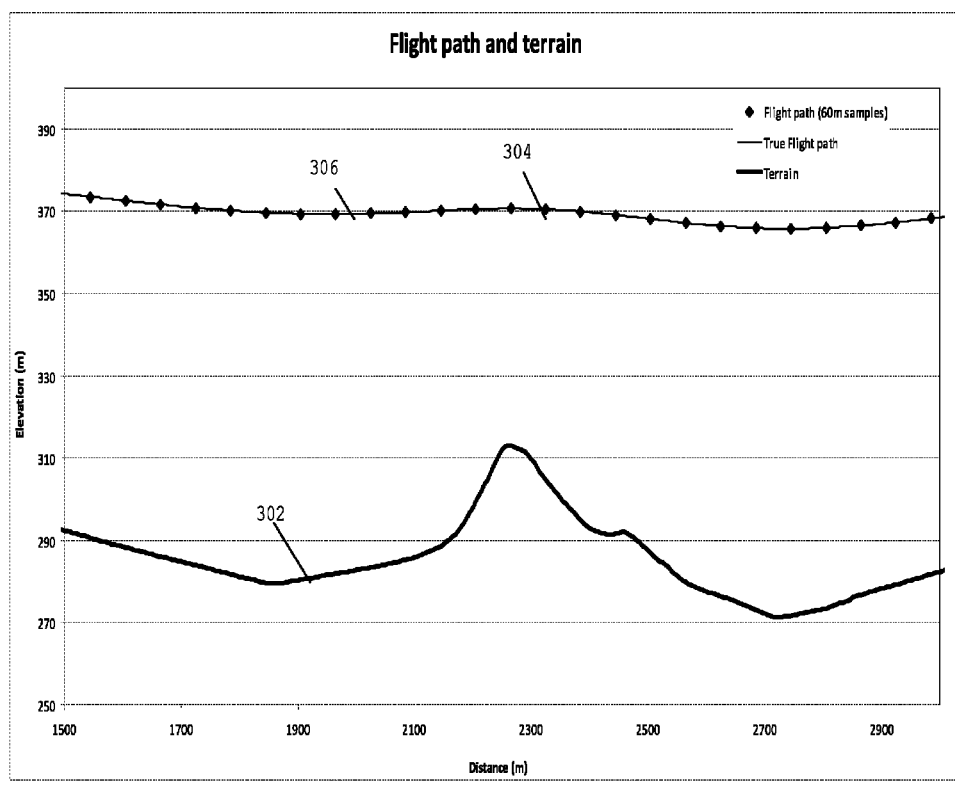
FIGS. 3 and 4 illustrate terrain and flight path data.

FIG. 3 shows plot 302 that illustrates a determined cross-section (topography) of a terrain surface over which a gravity gradiometer was flown. Plot 304 illustrates a profile of the flight path of the airborne gravity gradiometer and each dot corresponds to a location representative of a length of a respective flight path segment along which the gravity gradiometer was moved during the period of 1 second (approximately 60 meters in this example). In order to choose an optimum degree of sub sampling of the flight path, without adding unnecessary additional detail, an initial estimate is made of the "rate of change" of the terrain component of the total gravity gradient signal, and this is used to enable an "adaptive" sampling regime, which relates to the above description of the embodiment visualised in FIG. 2(b).

Figure 4:
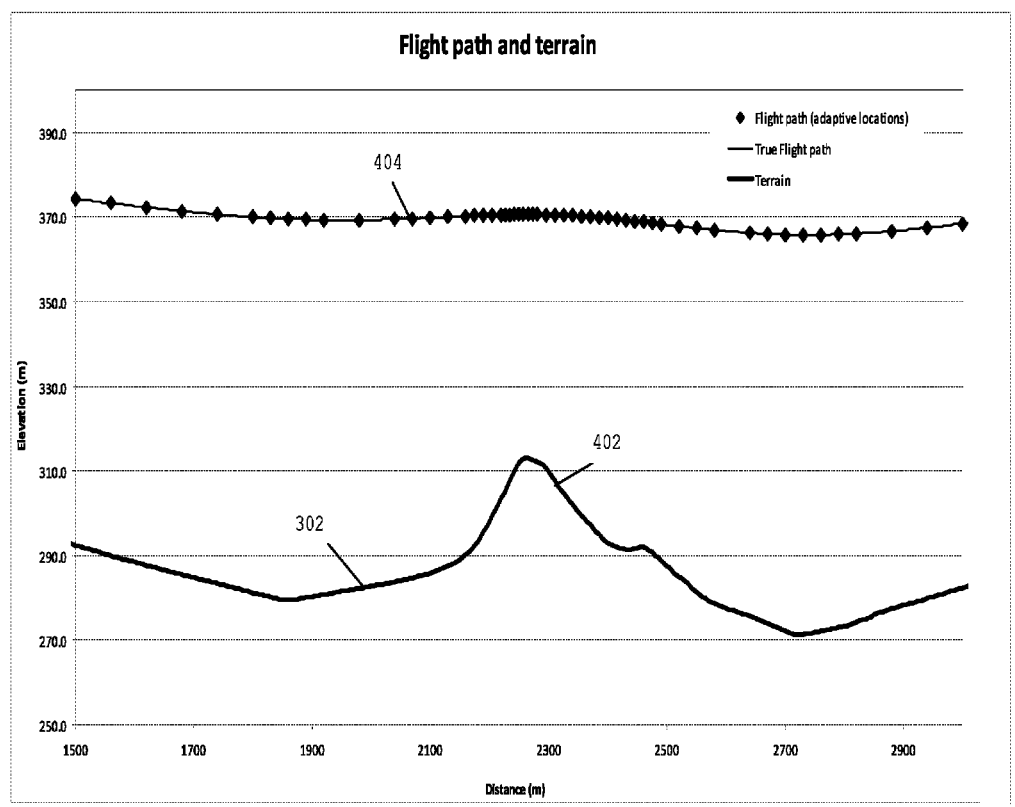

FIG. 4 shows the plot 302 having an area of interest 402 and the adaptive sampling regime. Dots of plot 404 represent locations along flight path segments for which the terrain response is calculated. In order to increase the accuracy, the terrain response is calculated for more locations at or near areas at which the terrain response changes more rapidly than at other areas.

Figure 5:
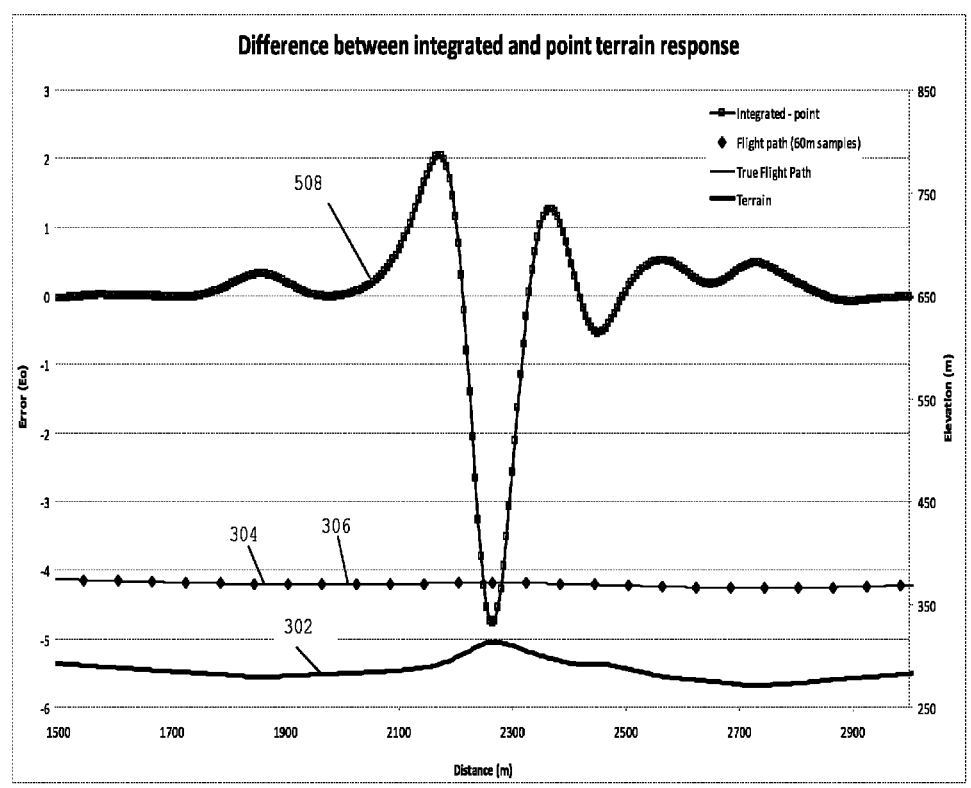
FIG. 5 illustrates a plot of the difference between terrain correction using a method in accordance with a specific embodiment of the present invention and results of a point determination of terrain effects using a known terrain correction method.

FIG. 5 shows also the plots 302, 304 and 306 at a scale that is different to that of FIGS. 3 and 4. Further, FIG. 5 shows plot 508, which illustrates the difference between gravity gradient data that were corrected using one gravity gradient response data point along each flight path segment (conventional method) and a method in accordance with an embodiment of the present invention which uses a plurality of gravity gradient response data points along each flight path segment (in this example 12). In this example, which uses relatively gentle terrain, the difference may be as much as 5 Eo and even larger differences are expected in areas of steeper terrain.

The terrain corrected gravity gradient data may then be plotted as a 2D grid map or further processed in various ways, including inversion modelling, to facilitate interpretation and the location of deposits of valuable material below the terrain surface.

It is to be appreciated that various variations of the described embodiments are possible. For example, the gravity gradiometer may be flown at any suitable speed and the gravity gradiometer may take measurements during any suitable time intervals.

Further, a suitable number of gravity gradient terrain response data points may be taken into account for correcting the gravity gradient data for the terrain effects.

The reference that is being made to prior patent documents is not an admission that the disclosure of these documents is part of the common general knowledge of a skilled person in Australia or any other country.

The invention claimed is:

1. A method of processing gravity gradient data indicative of an output generated by an airborne gravity gradiometer that is moving along a flight path over a terrain, the method comprising:
    providing the gravity gradient data using the airborne gravity gradiometer, the gravity gradient data comprising gravity gradient data elements, each gravity gradient data element being associated with a respective flight path segments of the airborne gravity gradiometer and being provided in the form of an integral of the gravity gradient data corresponding to that respective flight path segment along which the gravity gradiometer moved;
    providing terrain data indicative of a topography and a density or a density distribution of the terrain above a datum that is below the surface of the terrain over which the airborne gravity gradiometer is moved;
    providing information concerning the flight path of the airborne gravity gradiometer in three dimensions;
    calculating a theoretical gravity gradient response of the terrain using the provided terrain data and the provided information concerning the flight path, the theoretical gravity gradient terrain response being calculated for a plurality of locations along each of at least some of the flight path segments of the airborne gravity gradiometer; and
    correcting the provided gravity gradient data comprising calculating a difference between the calculated theoretical gravity gradient terrain response and the provided gravity gradient data for the plurality of locations along each of at least some of the flight path segments of the airborne gravity gradiometer.

2. The method of claim 1 wherein the theoretical gravity gradient response is calculated for a plurality of locations of the gravity gradiometer along each of at least the majority of the flight path segments.

3. The method of claim 1 wherein calculating the theoretical gravity gradient terrain response comprises integrating the theoretical gravity gradient terrain response data substantially along respective flight path segments to provide the theoretical gravity gradient terrain response data in the form of integrals that correspond to the respective flight path segments along which the gravity gradiometer is moved.

4. The method of claim 3 wherein calculating a difference between the calculated theoretical gravity gradient terrain response and the provided gravity gradient data comprises calculating a difference between the gravity gradient data elements that are provided in the form of integrals and the theoretical gravity gradient terrain response data that are provided in the form of integrals.

5. The method of claim 1 wherein calculating the gravity gradient response of the terrain comprises calculating the terrain response for a number of locations that are closer together in areas in which the terrain response changes more rapidly than in areas in which the terrain response changes less rapidly.

6. The method of claim 1 wherein providing flight path information comprises providing flight path data indicative of the location of the gravity gradiometer for a plurality of locations along each of at least some flight path segments.

7. The method of claim 6 wherein providing flight path information further comprises fitting the provided flight path data using a curve or spline to approximate the actual flight path segments of the gravity gradiometer.

8. The method of claim 7 wherein calculating the theoretical gravity gradient terrain response comprises integrating gravity gradient terrain response data using the curve or spline fitting flight path data.

9. The method of claim 1 comprising selecting a spacing between locations along the flight path for which the gravity gradient response of the terrain response is calculated.

10. The method of claim 9 wherein selecting the spacing is performed as a function of a change in the gravity gradient data along the flight path.

11. The method of claim 9 wherein selecting the spacing is performed as a function of a change in the gravity gradient response of the terrain that is initially calculated for some of the locations.

* * * * *